United States Patent [19]
Lorenz et al.

[11] 4,190,718
[45] Feb. 26, 1980

[54] PROCESS FOR INCREASING MOLECULAR WEIGHT OF VINYLPYRROLIDONE POLYMER

[75] Inventors: Donald H. Lorenz, Basking Ridge, N.J.; Earl P. Williams, Pen Argyl, Pa.; Herman S. Schultz, Lexington, Mass.

[73] Assignee: GAF Corporation, New York, N.Y.

[21] Appl. No.: 581,375

[22] Filed: May 27, 1975

[51] Int. Cl.² ............................................. C08F 26/10
[52] U.S. Cl. ............................... 526/207; 252/8.55 R; 260/29.6 R; 424/80; 424/358; 428/402; 521/131; 526/264
[58] Field of Search ..................... 526/207, 258, 264; 260/29.6; 521/131; 428/402

[56] References Cited

U.S. PATENT DOCUMENTS

| | | | |
|---|---|---|---|
| 2,335,454 | 11/1943 | Schuster et al. | 526/264 |
| 2,658,045 | 11/1953 | Schildknecht | 526/264 |
| 2,941,980 | 6/1960 | Robinson | 526/264 |
| 3,129,210 | 4/1964 | Grosser et al. | 526/264 |
| 3,153,640 | 10/1964 | Barnum et al. | 526/258 |
| 3,563,968 | 2/1971 | Merijan et al. | 526/264 |
| 3,651,035 | 3/1972 | Atkins | 526/264 |
| 3,689,439 | 9/1972 | Field et al. | 526/264 |
| 3,803,104 | 4/1974 | Barabas et al. | 526/264 |
| 3,862,915 | 1/1975 | Fried et al. | 526/264 |

OTHER PUBLICATIONS

Schildknecht, Vinyl and Related Polymers, published by John Wiley & Sons, Inc., New York (1952), p. 31.

*Primary Examiner*—Harry Wong, Jr.
*Attorney, Agent, or Firm*—Walter C. Kehm; Marilyn J. Maue

[57] ABSTRACT

The process for increasing the molecular weight of poly-N-vinylpyrrolidone over that normally obtained by suspension polymerization of N-vinylpyrrolidone in a saturated hydrocarbon suspension medium, by adding to the suspension medium a controlled amount of water, specifically an amount between about 1% and 35% by weight based on the total weight of N-vinylpyrrolidone monomer. The significantly higher molecular weight of the resulting polymeric product can be still further increased by additionally incorporating in the suspension medium between about 0.001 mol % and about 1 mol % of a difunctional vinyl cross-linking agent per mol of N-vinylpyrrolidone monomer. The polymeric products of the present invention are preferably water soluble granules having a porous structure; although the present invention also concerns the poly-N-vinylpyrrolidone having a number average molecular weight of between 400,000 and 2,000,000, preferably between 450,000 and 1,500,000 in any physical form.

15 Claims, No Drawings

PROCESS FOR INCREASING MOLECULAR WEIGHT OF VINYLPYRROLIDONE POLYMER

In general, solid poly-N-vinylpyrrolidone polymers have many desirable properties including stability toward heat and light, an absence of toxicity or irritability to skin, solubility in common solvents such as alcohols, ethers, ketones, etc. as well as water and aqueous systems. Such valuable properties have adapted moderate and higher molecular weight polymers of this type to various uses such as dispersing agents, protective coatings, laminates and films, viscosity modifiers for aqueous systems and film forming agents. Because of these basic advantages, it is desirable to further extend the molecular weight range of poly-N-vinylpyrrolidone so that the polymer can have even wider application as, eg. chemically inert filters, molecular sieves for organic compounds, catalyst carriers and the like and can be used to even better advantage in certain applications known heretofore such as cosmetic thickeners, pigment and dyestuff dispersants, and as oil recovery agents where such high molecular weight polymers can be employed to act as displacement agents in the recovery of oils from wells by use of water thickened with such improved polymers as hereinafter described. In addition to increasing the molecular weight of the polymer, it is also highly advantageous to produce poly-N-vinylpyrrolidone in porous granular form.

By the process of the present invention it is found that the molecular weight of poly-N-vinylpyrrolidone, prepared via a process of suspension polymerization, can be remarkably and unexpectedly increased by means of a relatively simple and commercially feasible expedient.

Solution polymerization processes employing an aqueous medium for N-vinylpyrrolidone are known and have provided commercially attractive polymeric products in a relatively wide range of viscosities (i.e. K values between about 30 and 90).

Other processes for the preparation of vinyl lactam polymers are described in U.S. Pat. Nos. 3,218,302 and 3,117,004, wherein the suspension medium is a nonaqueous organic liquid such as a halogenated hydrocarbon, an unsubstituted hydrocarbon, an organic ether, glycol or sulfide, which medium additionally contains a granulating agent to stabilize the suspension sustained by mechanical means. One disadvantage however, with processes of this type, is that it has not been possible to extend the molecular weight range or viscosity of the polymer much above that obtained by bulk-polymerization methods, i.e. about 100,000 number average molecular weight or a polymeric K value of about 50. Still another process for the polymerization of vinyllactam is described in British Pat. No. 1,111,503. Although the polymerization process of the British patent employs an organic liquid reaction medium similar to those listed above, this process employs no granulating agent to maintain a true suspension medium. Consequently the polymeric products, in addition to the deficiencies above, are not obtainable as substantially well formed discrete granules which are highly desirable for most applications.

It is, therefore an object of the present invention to provide a commercially feasible and economical process for producing a N-vinylpyrrolidone polymer having exceptionally high molecular weight and greatly improved K value.

Another object of the present invention is to provide an economical process for significantly increasing the molecular weight normally obtainable from the suspension polymerization of a N-Vinylpyrrolidone monomer in an organic suspension medium.

Another object is to produce water soluble poly-N-vinylpyrrolidone granules having a number average molecular weight greater than 250,000 in the form of a porous structure.

Another object of this invention is to provide a suspension polymerization process for the preparation of a high molecular weight N-vinylpyrrolidone polymer which avoids the need for pressurized reaction zones and which obtains the polymer in high solids concentration.

Still another object is to provide a suspension polymerization process for the preparation of a high molecular weight N-vinylpyrrolidone type polymer in the form of porous granules or beads. These and other objects of the invention will become apparent to those skilled in the art from the following description and disclosure.

According to this invention, there is provided a suspension polymerization for N-vinylpyrrolidone which comprises polymerizing at elevated temperature a liquid suspension medium containing the N-vinylpyrrolidone monomer, a saturated aliphatic hydrocarbon solvent as the suspension medium, an alkylated N-vinylpyrrolidone or N-vinylpyrrolidone-olefin copolymer (No. Av. MW at least 8,000) as a suspending or granulating agent to assist in maintaing the suspension, a free radical initiator and a controlled amount of water, between about 1 and about 35 weight percent based on weight of N-vinylpyrrolidone monomer. The suspension medium undergoing reaction may additionally contain between 0.001 and 1 mol percent of a difunctional vinyl cross-linking agent for N-vinylpyrrolidone when a polymer K value above about 100 is desired. However, it is to be understood that the incorporation of such cross-linking agent is optional in the present process and that the process, with or without cross-linking agent, is successful in producing a high molecular weight polymeric product in high solids concentration, such as a solids concentration of from about 20% to about 50%, more usually from about 30% to 40% by weight based on suspension.

Preferably, the high molecular weight polymeric product of the present invention is obtained as discrete granules ranging in size from grains in a fine powder up to granules of about 25 mils diameter.

Poly-N-vinylpyrrolidone porous granules having a viscosity (K value) from about 80 up to about 110 are readily obtainable by means of adding the above described critical amount of water to the suspension medium. However when higher viscosities, in the order of from about 100 to about 200 K value are desired, addition of both water and cross-linking agent to the suspension medium is preferably employed. In carrying out the present process to obtain a product of highest K value, care must be taken to provide substantially pure components in the reaction mixture and to evacuate all oxygen from the reaction zone.

The solvents in the present suspension polymerization of N-vinylpyrrolidone are those in which N-vinylpyrrolidone is miscible but not soluble and in which the high molecular weight N-vinylpyrrolidone polymeric product is substantially insoluble. The solvents are further characterized as being saturated aliphatic hydrocarbons and are superior to those aromatic, or halogen- or oxygen-containing solvents of the art in that the present solvents are more compatible with the suspension aids, necessarily included in the suspension medium. Illustrative of those solvents suitable for the present process are the saturated aliphatic hydrocarbons containing from 5 to about 20 carbon atoms which include mixtures of such compounds as may be prepared for such purpose or as may be found in commercially available mixtures such as for example, a petroleum cut of $C_6$–$C_{16}$ alkanes or other sources of hydrocarbon mixtures such as a kerosene or petroleum fraction boiling at about 175° C., e.g. Varsol; but above the temperature at which the polymerization effected. The preferred solvents for the present process are those alkanes having boiling points between 50° C. and 100° C. which are more easily separated from the polymeric product by boiling or evaporation. Most preferred of this group are normal and branched chain hexane, heptane, octane, and cycloalkanes such as, cyclopentane and cyclohexane. Solvent mixtures including even minor amounts of reactive oxygen-containing compounds, are best avoided in the present process since they tend to prematurely terminate polymer chains formed in the system and, in the case of certain azo initiators or catalysts, cause apparent deactivation which also materially limits the length of the polymer chains formed in the process by halting the reaction.

The amount of solvent needed for any suspension depends on several factors; namely, on the efficiency of agitation, the choice of catalyst, the temperature and pressure of operation and the optional use and amount of suspending agent present in the suspension medium. However generally, the solvent is employed in an amount equal to monomer up to a slight excess or as much as about 3.5 parts by weight per part by weight of monomer. The preferred amount of solvent employed in the present polymerization is between about 1.5 and about 2 parts by weight per part of monomer. Such a mixture provides an adequate dissipation of heat built up in the reaction zone by the formation of polymer in the beads or globules of the suspension while still maintaining the reaction volume at a reasonable level so as to avoid the need for oversized equipment and other inefficiencies and difficulties in product recovery. Generally, the amount of solvent employed is that necessary to maintain the suspension and avoid agglomeration of suspended particles.

As stated above, the dispersion in the present process is maintained primarily by mechanical agitation in a standard type mixing zone such as in a stirred reactor. However, maintenance of the suspension is enhanced and prolonged during polymerization by the addition of small amounts of suspension stabilizers of the type used to prevent agglomeration of the suspended droplets or globules which become more viscous and sticky as polymerization progresses. In effect, the stabilizer adheres to the surface of the globule and protects it from direct contact with another during the period when the polymeric globules are forming. The function of the stabilizer is particularly important in the present process where a high solids concentration is achieved. Although any stabilizer associated with the polymeric granules or filter cake product is usually not recovered, it is to be understood that, if desired, the stabilizers can be completely removed from the surface of the granules or filter cake after completion of polymerization by washing the solid product with solvent and drying or by any other convenient method.

Such stabilizers or suspension aids which are found to be useful in the present process are the poly-N-vinylpyrrolidone alkyl-modified polymers (eg. N-vinylmethylpyrrolidone polymers and copolymers with methyl substituted monomer) and the N-vinylpyrrolidone $C_{10}$ to $C_{20}$ olefin copolymers commercially available through GAF Corporation and marketed under the commercial names of ANTARON* P-904, ANTARON* P-804, ANTARON* V-816, ANTARON* V-516, GANEX* P-904, GANEX* V-220, GANEX* V-516, etc., which are substantially insoluble in the solvents of the present process. Generally, for the present purposes, the stabilizer is employed in an amount between about 0.5% and about 5% preferably between about 1% and about 3% by weight based on the weight of monomer. Conveniently, the above stabilizers are polymers having a number average molecular weight between about 8,000 and about 20,500.

*Trademark of GAF Corporation

The catalyst or polymerization initiators found to be most effective in the present suspension polymerization are those of the free radical type which are soluble in the monomer. Accordingly, suitable initiators for the present process include azodiisobutyronitrile (commercially available as VAZO-64), azodiisovaleronitrile (commercially available as VAZO-52), dimethyl azodiisobutyrate, benzoyl peroxide, t-butyl hydroperoxide, t-butyl peracetate, acetyl peroxide, di-t-butyl peroxide, di-cumyl peroxide, cumyl hydroperoxide and generally any of the oil-soluble free radical initiators conventionally employed for polymerization. The particular initiator may be selected in accordance with the temperature of polymerization so that the catalyst remains in the liquid phase during reaction. In an oxygen free system, the proportion of initiator employed is between about 0.02% and 2% by weight, preferably between about 0.05% and about 1.0% by weight based on total weight of monomer. However, when oxygen contaminant is present, an additional amount of initiator is employed eg. the above amount plus an equimolar amount for every mol of oxygen in a free state or reducible to a free state. Instead of, or in addition to, the initiators listed above, actinic light with or without the aid of a photosensitizer, eg. benzophenone, fluorescein, eosin, etc., may be used but is less desirable.

In general, the present suspension polymerization can be carried out by forming a mixture of the solvent, monomer, catalyst, suspension stabilizer and between 1% by weight and about 35% by weight water, based on the weight of N-vinylpyrrolidone. This mixture can be formed initially in the same zone or the mixture of monomer and solvent can be performed with or without the stabilizer and at least the initiator and water can be separately added thereto. Instead of this, a separate aqueous initiator mixture can be prepared and added to the monomeric suspension. Alternatively water can be added incrementally prior to and during polymerization. In the later case, an amount of water within the upper portion of the recited range, for example between about 12% by weight and 35% by weight, is beneficially employed.

The addition of water between about 1% and 35% by weight is critical in obtaining the increased molecular weight product of the present process. While the mechanism of the present process is not certain, it is probable that the water swells the reacting monomer globules, complexes with the polymer as it is formed and orients the polymer to enhance chain addition. This chemical affect of water on the reacting species is totally unexpected for the reason that heretofore water has been regarded as suitable for the inert medium in which emulsion or suspension polymerizations are carried out. There is no suggestion or evidence in prior polymerization process that water would have any affect other than, or in addition to, its function as an inert heat exchange medium. However, it has now been discovered that water, if used within the critical range set forth above, is capable of exerting a strong influence on the molecular weight of the polymeric product, such that a poly-N-vinylpyrrolidone of molecular weight heretofore unobtainable, can be achieved. Further, it is now discovered that such production can be achieved by a commercially and economically feasible process. The water in controlled amount may also provide a lower and more constant temperature within the globules, notwithstanding the dissipation of heat by means of the organic solvent, so as to slow down the polymerization reaction occuring within the globules and thereby deter or postpone chain termination. While one cannot be certain that the mechanism involving water is exactly as described, this theory provides the most plausible explanation for the substantial net increase in the molecular weight of polymer normally attainable from N-vinylpyrrolidone.

In accordance with the present invention, at least 1% by weight of water must be added to or mixed with the suspension medium in order to achieve any significant increase in molecular weight of the polymer. Since within the limits of the ranges set forth, the amount of water at its lower concentrations is directly proportional to the amount of solvent used, at water concentration as low as 1% by weight it is generally desirable to employ at least 1.5 parts by weight solvent or more. When more than 35% by weight water is added to or mixed with the suspension, the suspended globules undergo such swelling that the particles or globules begin to dissolve in the water and, as a consequence, become extremely tacky forming larger agglomerations which do not remain in suspension but settle to the bottom of the reactor and permit build-up of exothermic heat of reaction until solvent loss occurs through flash evaporation when the reaction is carried out under adiabatic reaction conditions. Such local run away temperatures cause chain termination, consequently the present high molecular weight polymer of the present invention is not achieved. Additionally, the loss of solvent dispersant due to lack of temperature control, provides an inefficient and economically unfeasible process for polymer production.

Insofar as the products of the present invention are concerned, molecular weights of the polymers may range from about 200,000 to 200,000 or more. Viscosity measurements are commonly used as an indication of the average molecular weight of the polymeric composition. The K value (Finkentscher) of any particular mixture of polymers is calculated from viscosity data and is useful as an indication of the average molecular weight of such mixture. The determination of the K value is fully described in *Modern Plastics*, vol. 23, No. 3, pp. 157-61, 212, 214, 216 and 218 (1945); and is defined as 1,000 times k in the empirical relative viscosity equation:

$$\frac{\log_{10} \eta \text{ rel.}}{C} = \frac{75 k^3}{1 + 1.5 k C} + k$$

wherein C is the concentration in grams per 100 cc. polymer solution and $\eta$ rel. is the ratio of viscosity of solution to that of pure solvent. The K values are reported as 1000 times the calculated viscosity coefficient in order to avoid the use of decimals. For the purpose of the present invention, there may be employed those polymeric substances having a K value of between about 80 and 200, preferably between about 90 and 160.

K values and specific viscosities ($\eta$ sp.) are interconvertible and are related through relative viscosity ($\eta$ rel.). Thus, when viscosity measurements are taken on solutiion which have a concentration of 1.00 g. polymer per deciliter of solution at 25° C. (C=1), the relations are as follows:
1. n rel.=n sp.+1
2. Relative viscosity=specific viscosity+1
3. Relative viscosity=10[0.001 K+0.000075 K²/(1+0.0015 K)]
4. n sp.=−1+10[0.001 K+0.000075 K²/(1+0.0015 K)]

Relative viscosity, specific viscosity, and K are dimensionless, whereas inherent viscosity (log. e n rel.+C) and intrinsic viscosity (the limit of inherent viscosity as C approaches 0) have the dimensions of dilution, that is, the reciprocal of concentration. Intrinsic viscosity and K are intended to be independent of concentration. By the addition of controlled amounts of water within the above described ranges, preferably within the range of from about 4% to about 30% by weight, molecular weights of poly-N-vinylpyrrolidone having K values up to about 110 or higher, are obtainable.

Still higher molecular weight non-gelled polymers are obtainable when a difunctional, cross-linking agent in an amount, preferably between 0.005 and about 0.5 mol percent (based on mols of N-vinylpyrrolidone) is added to the water doctored suspension system. In this way molecular weights as high as those corresponding to 200 K value are obtainable. While the preferred cross-linking agents for the present process are compounds containing between 6 and 20 carbon atoms and polymers having terminal vinyl groups, such as, diallyl phthalate, diallyl polyethylene glycol, allyl acrylate, N,N-methylenebisacrylamide, 1,7-octadiene, butanediol-diacrylate or -dimethacrylate, ethylene glycol dimethacrylate, diethylene glycol dimethacrylate, tetraethylene glycol dimethacrylate, allyl methacrylate, butanediol diacrylates, divinyl benzene, divinyl ethylbenzene, divinyltoluene, divinylnaphthalene, and divinylchlorobenzene or combinations of these polyvinyl compounds; any cross-linking agent of the groups including the alkylenebisacrylamides, the alkylene glycol dimethlacrylates, divinyl mono- and di-cyclic aromatic compounds, etc., such as those described in U.S. Pat. No. 3,689,439 column 3, and Table II of U.S. Pat. No. 3,235,490, may be employed in the present invention. When such cross-linking agents are employed in amounts as high as 1 mol percent, extremely high molecular weight products can be obtained, however, the polymer is a water-insoluble agglomerate mass and is not obtainable as discrete particles or as a finely suspended powder unless ground to desired particle size. Since this highly water-insoluble form does not possess the desired porosity, it is preferable to avoid products which are more than 0.5% cross-linked. Further in regard to the physical form of the polymeric product, it should be understood that whatever the size of the polymer particle, it can subsequently be ground to granules of desired size.

Broadly, the present suspension polymerization is carried out, under conventional reaction conditions such as at a temperature of between about 50° C. and about 120° C., preferably between about 65° C. and about 85° C., under a pressure of from about 15 mmHg to 25 psig preferably under substantially atmospheric pressure, over a period of from 1 to 12 hours, usually not more than about 8.5 hours, with constant agitation such as obtained by mechanical stirring in the reaction zone or by ebullition of solvent under continuous reflux conditions. Generally, the polymerization reaction is more than 80% completed within the first 2 or 3 hours.

A preferred technique in carrying out the suspension polymerization to provide finely dispersed powder or granules involves preparing a mixture of a major portion of the monomer, distilled water, solvent and suspension stabilizer, either in the presence or absence of the cross-linking agent, and then to bring the mixture to the desired polymerization temperature before the addition of a separately prepared mixture of initiator in solution with the balance of the portion of monomer. Such procedure avoids the disadvantage of passing through lower temperatures in the presence of initiator which tends to promote the formation of low grade polymer or conducting the reaction at those temperatures which provide low reactivity with concomitant slow rates of reaction resulting in entrapment of suspended monomer in the globules and the formation of product as a tacky mass.

The particulate polymeric product of the present invention is collected on a filter in the form of a cake which resumes its particulate form after it is washed and dried. Washing can be accomplished with the same solvent employed as the dispersing agent or with a different lower boiling dispersing agent or with any inert, conventional washing agent; for example a ketone such as, methyl ethyl ketone, acetone, butanone, cyclohexanone, an ether such as butyl ether, dioxane, petroleum ether, and other inert liquids such as tetrahydrofuran, benzene, toluene, xylene, etc. or, in fact, any inert liquid which may advantageously displace a higher boiling dispersant associated with the solid product. Such replacement of the higher boiling liquid facilitates air or vacuum drying of the products. Mixtures of these washing materials may also be used in the washing operation.

A small amount, e.g. 5% to 30% by weight of an alkali metal or ammonium salt electrolyte, based on weight of water, such as the sulfate, acetate, halide or phosphate of sodium, potassium, lithium or ammonium can also be incorporated into the polymeric suspension for added porosity in the polymeric products.

This invention will appear more specifically in the examples which follow; however, these examples are set forth only by way of illustration and are not to be construed in any way limiting to either the spirit or scope of the present invention as set forth in the appended claims and in the foregoing disclosure. It is also to be understood that any of the proportions of cross-linking agent and/or water which fall within the above described ranges, and any of the above specified solvents, stabilizers or initiators can be substituted in any one of the following examples to provide a N-vinylpyrrolidone polymer of significantly higher molecular weight. Further, it is to be understood that any of the above defined cross-linking agents can be added to the suspension, initially or after initiation of the polymerization, most preferably in amount between 0.02 and 0.1 mol % based on mols of monomer initially present in the suspension to provide still higher molecular weight N-vinylpyrrolidone polymer, ie. such that viscosity K values of 175 and higher are provided.

All proportions and parts designated in the following examples are by weight unless otherwise indicated.

EXAMPLE 1

Into a steel autoclave, containing a double 6-bladed turbine stirrer and a thermowell, which has been rinsed with distilled water and thoroughly purged with nitrogen is added the following mixture:

2125 grams N-vinylpyrrolidone monomer 425 grams distilled water (17 weight percent based on total weight vinylpyrrolidone)

50 grams GANEX V-516 (a suspending agent produced by GAF Corporation and comprising a 50/50 graft copolymer of vinylpyrrolidone and $C_{16}$ olefin)

5,000 grams n-heptane

The order of addition for the above components involves introducing the N-vinylpyrrolidone to the mixture of heptane and suspending aid during continuous stirring and subsequently adding water. However, it is to be understood that any other order of addition in forming the suspension can be employed to equal advantage. Also, if desired, additional amounts of suspending agent may be added during the course of polymerization.

In a separate cylinder, 375 grams of N-vinylpyrrolidone monomer is mixed with 1 gram of azobisisobutyronitrile (a polymerization initiator supplied by DuPont under the tradename VAZO-64). Both the reactor and the cylinder are evacuated to 10 inches Hg vacuum gage and the vacuum released with drygrade nitrogen. This procedure is repeated 12 times.

After contents of the stirred reactor is brought to 75° C., the contents from the cylinder is charged to the reactor with continuous stirring. The reactor is then sealed and held at a temperature of between 74° C. and 76° C. for a period of 8 hours after which it is cooled to about room temperature and the contents discharged to a filter. The resulting filter cake is then tray dried at 50° C. under mild vacuum to provide a dry weight of 2375 grams poly-N-vinylpyrrolidone.

The relative viscosity of the poly-N-vinylpyrrolidone is determined by preparing a 1% (weight per volume) solution of the dried polymer in C.P. ethanol. Viscosity of the above polymer is found to be 4.43 which corresponds to K value of 91.8 and a number average molecular weight of approximately 370,000.

The substantially high molecular weight poly-N-vinylpyrrolidone obtained in this example, can be added to a cosmetic face cream formulation in an amount of between about 0.1% and about 10% by weight of the formulation to produce a thickening affect therein; and consequently to promote moisturizing properties in the cream. As a specific example, to 50 grams of Albolene Cream *(a cleansing cream) is added 1% of the above polyvinylpyrrolidone of about 92 K value. The resulting cleansing cream is considerably thickened to the consistency of a heavier night cream and moisturing properties of the cream are apparent.
* Produced by Norcliff Laboratories Inc.

The above suspension polymerization is repeated except that the addition of 425 grams of distilled water is replaced with an equivalent amount of n-heptane so that 5,500 grams of n-heptane are employed. The resulting polymer has a K value less than 83.

EXAMPLE 2

The procedure outlined in Example 1 is repeated except that the mixture charged to the reactor is as follows.

2125 grams N-vinylpyrrolidone
750 grams distilled water (30% based on total weight of vinylpyrrolidone monomer)
50 grams GANEX V-516
4,000 grams heptane A mixture is prepared in an addition cylinder substantially the same as that used in Example 1 and the reaction conditions employed therein are also duplicated. In this example, 2205 grams of poly-N-vinylpyrrolidone are obtained. The relative viscosity is similarly determined by preparing a 1% (weight/volume) solution of dried polymer in C.P. ethanol. The viscosity in this example is 7.63 which corresponds to a K value of 109.6 and a number average molecular weight of approximately 550,000.

The product of this example is particularly useful in the polymer flooding oil recovery process (fully described in the Journal of Petroleum Technology, January 1974, pages 33–41). A solution of the above dried product can be substituted for PUSHER 700 (hydrolyzed polyacrylamide) in the same concentrations and under the same conditions as set forth in said publication to provide greatly improved oil recovery. The present product substituted for PUSHER 700 can be employed with our without the polymer conserving agent.

EXAMPLE 3

The general procedure and equipment outlined in Example 1 is again repeated except that the proportions and ingredients of the reaction mixture are varied in accordance with the following formulation.

2200 grams N-vinylpyrrolidone
500 grams distilled water
50 grams GANEX V-516
4,000 grams heptane
3.8 grams diallyl polyethylene glycol 600 (a cross-linking agent prepared by the reaction of allyl chloride with polyethylene glycol commercially available from GAF Corporation as GAFANOL E-600).

The addition cylinder is charged with 1 gram of VAZO-64 and 300 grams of N-vinylpyrrolidone monomer. From this example, 3110 grams of poly-N-vinylpyrrolidone product is recovered. The relative viscosity obtained by 1% dried product (weight/volume) C.P. ethanol is 41.47 which corresponds to a K value of 155 and a number average molecular weight of approximately 1,200,000.

The product of this example is beneficially employed as a pigment dispersant. Specifically, an amount of between 0.3 weight percent and about 5 weight percent, in the present example 4 weight percent, of this exceptionally high molecular weight polymer is added to the following composition with constant stirring.

300 grams DIXON micronized graphite
700 grams distilled water

The mixture is then milled in a fluid shear mill for 2 hours. On standing for 24 hours, a black supernatant layer is formed over a lower high viscosity thixotropic layer. The supernate is decanted filtered through a Whatman No. 40 filter paper and tested. The filtered supernate is stable to electrolyte at pH 4–11 without coagulation or precipitation.

EXAMPLES 4, 5, 6 and 7

The procedure and equipment outlined in Example 1, together with the formulation designated, is repeated for examples 4, 5, 6 and 7 except that varying amounts of the same solvent or different hydrocarbon solvents are employed. The specific solvents used as the suspension medium and the concentration ratios of solvent to N-vinylpyrrolidone on a weight to weight basis are set forth in the following Table 1.

TABLE 1

| | | Solvents Substituted for 5,000 g. heptane in Example 1 | | |
|---|---|---|---|---|
| | | Suspension Characteristics | | |
| Example | SOLVENT | Solvent:VP (wt:wt) 2:1 | Solvent:VP(wt:wt) 1.8:1 | Solvent:VP (wt:wt) 1.6:1 |
| 4 | Benzene | poor dispersion not maintainable | poor dispersion not maintainable | poor dispersion not maintainable |
| 5 | n-Hexane | excellent | very good | very good |
| | n-Hexane controls exotherm because of reflux temperature (68° C.) Hexane is equally good with other suspension aids (eg. Ganex V-220; Ganes-P904 vinyl acetate graft on Ganex V-220). | | | |
| 6 | n-Heptane | excellent | excellent | excellent |
| | n-Heptane is equally good with the suspension aids mentioned above for n-Hexane. | | | |
| 7 | 1,1-dimethyl-octane | very good | very good | very good |

Solvent such as xylene and toluene also show poor results even at a relatively high solvent concentration, such as 2:1. These aromatic solvents are not able to maintain the desired suspension unless economically prohibitive amounts of suspension aid and commercially unfeasible mixing devices are employed.

The polymer produced in Example 4, with benzene as the solvent shows little compatability with the suspension aid; and therefore, poor dispersions were obtained.

The following Examples were carried out to establish that small, controlled amounts of water added to the suspension medium in the suspension polymerization of N-vinylpyrrolidone monomer exerted a pronounced affect on the molecular weight and K value of the polymeric product produced. Accordingly, Examples 8 through 18 report and compare the specific affect of water-free suspension media with those media containing varying amounts of water. These results are tabulated in Table II.

The general procedure and apparatus reported in Example 1 is repeated for each of the following Examples except that, in Examples 8, 9 and 10, 0.1% by weight Vazo-64 (based on monomer), is employed; whereas, in the remaining Examples, 0.04% by weight Vazo-64 is used. Also, instead of the 425 grams of distilled water reported in Example 1, the water concentration is varied in accordance with the weight percent shown below in Table II.

TABLE II

| Example | % by weight H$_2$O (per wt. of VP) | K-value of resulting polymer | Number Average M.W. of product (M̄n) |
|---|---|---|---|
| 8 | 0 | 77.5 | — |
| 9 | 2 | 81.5 | — |
| 10 | 10 | 86.5 | — |
| 11 | 13 | 87.4 | 330,000 |
| 12 | 15 | 92.0 | 380,000 |
| 13 | 18 | 94.5 | 400,000 |
| 14 | 20 | 97.6 | 410,000 |
| 15 | 22 | 100.4 | 450,000 |
| 16 | 25 | 107.5 | 520,000 |
| 17 | 30 | 108.0 | 520,000 |
| 18 | 33 | — | agglomeration occured |

Although at 33% by weight water, agglomeration of the suspended particles occured, this disadvantage is avoided when higher proportions of solvents are employed in the reaction zone; i.e. in the order of between 2.5:1 and 3:1 solvent:monomer or the suspension aid is employed in higher concentrations. Under any of the above conditions, the % by weight of water can be increased up to about 35 weight percent to provide polymer of markedly increased molecular weight. However, above 35% by weight water, a tacky agglomerate mass of undesirable polymer is produced.

The following Examples 19 through 31 demonstrate the affect of various cross-linking agents in varying concentrations on the suspension media of the present process. The general procedure and apparatus set forth in Example 1 is followed in each of these Examples except that water is varied in accordance with the amounts reported in Table III. Also, the specific cross-linking agents in the amounts listed in the following Table are added to the monomeric suspension in the reactor upon commencement of the polymerization reaction.

In each case, cross-linking agent in the water doctored suspension cause the resulting polymer to achieve K values in excess of 100 and high molecular weights, eg. as high as 1,200,000. These polymeric products are water soluble granular poly-N-vinylpyrrolidone having a porous structure.

TABLE III

| Example | Cross-linking agent/ (mol% per mol VP) | % by weight H$_2$O (per wt. VP) | No. Average M.W. (M̄n) of polymer product | K Value of polymer product |
|---|---|---|---|---|
| | Diallylphthalate | | | |
| 19 | 0.005 | 28 | 510,000 | 105.7 |
| 20 | 0.01 | 28 | 560,000 | 111.6 |
| 21 | 0.02 | 20 | 660,000 | 120.0 |
| 22 | 0.044 | 28 | 670,000 | 121.5 |
| | Diallyl polyethylene glycol 600 | | | |
| 23 | 0.005 | 28 | 580,000 | 112.5 |
| 24 | 0.01 | 28 | 640,000 | 118.0 |
| 25 | 0.013 | 28 | 670,000 | 121.3 |
| 26 | 0.02 | 20 | 1,200,000 | 155.0 |
| | Methylene bisacrylamide | | | |
| 27 | 0.01 | 28 | 520,000 | 107.3 |
| 28 | 0.02 | 20 | 490,000 | 104.0 |
| 29 | 0.071 | 28 | 490,000 | 103.9 |
| | 1,7-octadiene | | | |
| 30 | 0.044 | 20 | 460,000 | 102.2 |
| 31 | 0.1 | 20 | 555,000 | 110.4 |

Having thus described our invention, we claim:

1. In a process for the polymerization of N-vinylpyrrolidone in a liquid medium with a free radical polymerization initiator in a reaction zone, the improvement which comprises: forming a liquid mixture comprising N-vinylpyrrolidone monomer, at least an equivalent amount up to 3.5 parts by weight per part of monomer of a saturated aliphatic hydrocarbon of 5 to 20 carbon atoms as a suspension medium, a suspension aid, and a controlled amount between about 1% by weight and about 35% by weight of water per weight of monomer in the mixture; agitating said liquid mixture to form a suspension of N-vinylpyrrolidone liquid globules and reacting said N-vinylpyrrolidone in suspension to produce a solid polymer of N-vinylpyrrolidone having a number-average molecular weight of at least 200,000.

2. The process of claim 1 wherein the controlled amount of water is present in an amount between about 2% by weight and about 30% by weight of monomer.

3. The process of claim 1 wherein the suspension is formed by presuspending a mixture comprising a major portion of the total amount of monomer in the suspension medium, the controlled amount of water, and the suspension aid and adding to said presuspension a mixture comprising the remaining minor portion of monomer and the polymerization initiator.

4. The process of claim 3 wherein the presuspension is heated to about polymerization temperature prior to the addition of the monomer-initiator mixture.

5. The process of claim 1 wherein there is added to said liquid mixture, between about 0.001 and about 1.0 mol % based on monomer of a difunctional, polyunsaturated crosslinking agent containing 6 to 20 carbon atoms.

6. The process of claim 5 wherein the cross-linking agent is diallylphthalate.

7. The process of claim 5 wherein the cross-linking agent is diallylpolyethylene glycol.

8. The process of claim 5 wherein the cross-linking agent forms a part of the initial liquid mixture.

9. The process of claim 1 wherein the product polymer is separated from the reaction by filtration to form a filter cake and wherein the filter cake is washed with a solvent having a boiling point below about 100° C., and dried.

10. The process of claim 9 wherein the dried product is removed from the filter and ground to smaller particle size.

11. The process of claim 5 wherein the product polymer is separated from the reaction by filtration, washed with a solvent boiling below about 100° C. and dried.

12. The process of claim 5 wherein the cross-linked polymeric product of the process is obtained as discrete porous particles having a diameter not more than 25 mils.

13. The process of claim 5 wherein the cross-linked polymeric product of the process is obtained as discrete porous particles having a diameter not more than 25 mils.

14. The process of claim 1 wherein the liquid mixture contains between 1 part by weight and 3.5 parts by weight $C_5$ to $C_{20}$ paraffin as said liquid suspension medium per part by weight N-vinylpyrrolidone monomer; and between about 0.05% and about 5% by weight of a free radical initiator based on monomer, and said suspension of said liquid globules is reacted at a temperature between about 50° C. and about 120° C. under a pressure of from about 15 mm Hg to about 25 p.s.i.g. for a period of from 2 to 12 hours.

15. The process of claim 14 wherein the liquid mixture additionally contains between about 0.005 mol % and about 0.5 mol % based on monomer, of a difunctional polyunsaturated cross-linking agent.

* * * * *